United States Patent [19]

Lagasse

[11] Patent Number: 4,633,590
[45] Date of Patent: Jan. 6, 1987

[54] TUBE WALL THICKNESS MEASUREMENT APPARATUS

[75] Inventor: Paul R. Lagasse, Santa Fe, N. Mex.

[73] Assignee: The United States of America as represented by the United States Department of Energy, Washington, D.C.

[21] Appl. No.: 747,204

[22] Filed: Jun. 21, 1985

[51] Int. Cl.$^4$ .............................................. G01B 5/06
[52] U.S. Cl. ................................. 33/148 R; 33/172 B
[58] Field of Search ..................... 33/172 R, 544, 545, 33/542, 148 F, 148 R, 148 E, 147 R, 551, 553, 554, 546, 556, 558, 143 R, 172 B, 167

[56] References Cited

U.S. PATENT DOCUMENTS

| | | | |
|---|---|---|---|
| 1,226,396 | 5/1917 | Slocomb | 33/167 |
| 2,511,276 | 6/1950 | Ljungstrom et al. | 33/148 R X |
| 2,587,774 | 3/1952 | Shack et al. | 33/148 R X |
| 2,657,468 | 11/1953 | Lyons | 33/172 B |
| 2,965,970 | 12/1960 | Rocheleau | 33/172 B X |
| 3,507,046 | 4/1970 | Smith et al. | 33/149 R |
| 3,913,234 | 10/1975 | Windle | 33/147 E |

FOREIGN PATENT DOCUMENTS 826695 1/1960 United Kingdom ............. 33/148 R

OTHER PUBLICATIONS

L. S. Starrett Company, Sixth Edition, Catalog No. 27, pp. 326–327 (1979).

*Primary Examiner*—William D. Martin, Jr.
*Attorney, Agent, or Firm*—Lee W. Huffman; Ray G. Wilson; Judson R. Hightower

[57] ABSTRACT

An apparatus for measuring the thickness of a tube's wall for the tube's entire length and circumference by determining the deviation of the tube wall thickness from the known thickness of a selected standard item. The apparatus comprises a base and a first support member having first and second ends. The first end is connected to the base and the second end is connected to a spherical element. A second support member is connected to the base and spaced apart from the first support member. A positioning element is connected to and movable relative to the second support member. An indicator is connected to the positioning element and is movable to a location proximate the spherical element. The indicator includes a contact ball for first contacting the selected standard item and holding it against the spherical element. The contact ball then contacts the tube when the tube is disposed about the spherical element. The indicator includes a dial having a rotatable needle for indicating the deviation of the tube wall thickness from the thickness of the selected standard item.

13 Claims, 6 Drawing Figures

TUBE WALL THICKNESS MEASUREMENT APPARATUS

This invention is the result of a contract with the Department of Energy (Contract No. W-7405-ENG-36).

BACKGROUND OF THE INVENTION

The invention described herein relates generally to structures for measuring the thickness of tube walls and more particularly to structures for determining the deviation of the tube wall thickness from the known thickness of a selected standard item.

There are uses for tubes which require that the tube walls have a precise thickness. An example is the gold tubes manufactured by electrochemistry processes. Conventionally, ultrasonic and radiographic measurements have been made to determine tube thickness. However, repeatable measurements to within ±0.005 cm are difficult to obtain using these techniques. Furthermore, these techniques are time consuming and expensive. The tubes have to be transported from their fabrication facility to be measured. It is desirable to develop a measurement device that is portable and has improved accuracy and precision. Furthermore, conventional micrometers and calipers cannot be used to measure the thickness of a tube for its entire length because they cannot reach the internal middle portions of a tube much longer than a few centimeters.

SUMMARY OF THE INVENTION

One object of the present invention is to provide an improved tube wall thickness measurement apparatus.

Another object of the invention is to measure tube wall thicknesses accurately, quickly, inexpensively and with a high degree of precision for the entire length of the tube.

Still another object of the invention is to provide a portable tube wall thickness measurement apparatus.

To achieve the foregoing and other objects, and in accordance with the purposes of the present invention, as embodied and broadly described herein, there is provided an apparatus for measuring the thickness of a tube's wall for the tube's entire length and circumference by determining the deviation of the tube wall thickness from the known thickness of a selected standard item. The apparatus comprises a base and a first support member having first and second ends. The first end is connected to the base. The first support member has a sufficiently small cross section that the tube can be slid over the first support member. A spherical element is connected to the second end of the first support member. The spherical element has a sufficiently small circumference at its equator that a tube to be measured can be slid over the spherical element. A second support member has first and second ends and is spaced apart from the first support member. The second support member is connected at its first end to the base. A positioning element is connected to and movable relative to the second support member. An indicator is connected to the positioning element and is movable thereby to a location proximate the spherical element. The indicator indicates the deviation of the tube wall thickness from the known thickness of the standard item. The indicator includes a contact ball for contacting the selected standard item and holding it against the spherical element. The contact ball contacts the tube when the tube is disposed about the spherical element. The indicator includes a dial having a rotatable needle for indicating the deviation of the tube wall thickness from the thickness of the standard item. The rotatable needle is operatively connected to and responsive to the position of the contact ball.

The dial can be adjustable to a zero position to correspond to the thickness of the standard item. The base can include portions defining first and second bores for receiving the first and second support members respectively. The first and second support members are preferably elongated metal rods. The first support member and the spherical element can be connected permanently with epoxy. The spherical element can be a sphere or it can include substantially flat polar portions. The first and second support members can be substantially parallel to each other. The positioning element is preferably an elongated metal rod. The positioning element or the second support member can include a fine adjustment element for precisely moving the contact ball.

One advantage of the present invention is that it provides measurements having improved accuracy and precision.

Another advantage of the invention is that it is portable.

Yet another advantage of the invention is that it can measure tube wall thickness radially and over the entire length of the tube.

Still another advantage of the invention is that the tube wall measurements can be performed quickly and on site.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE INVENTION

Figure 1:
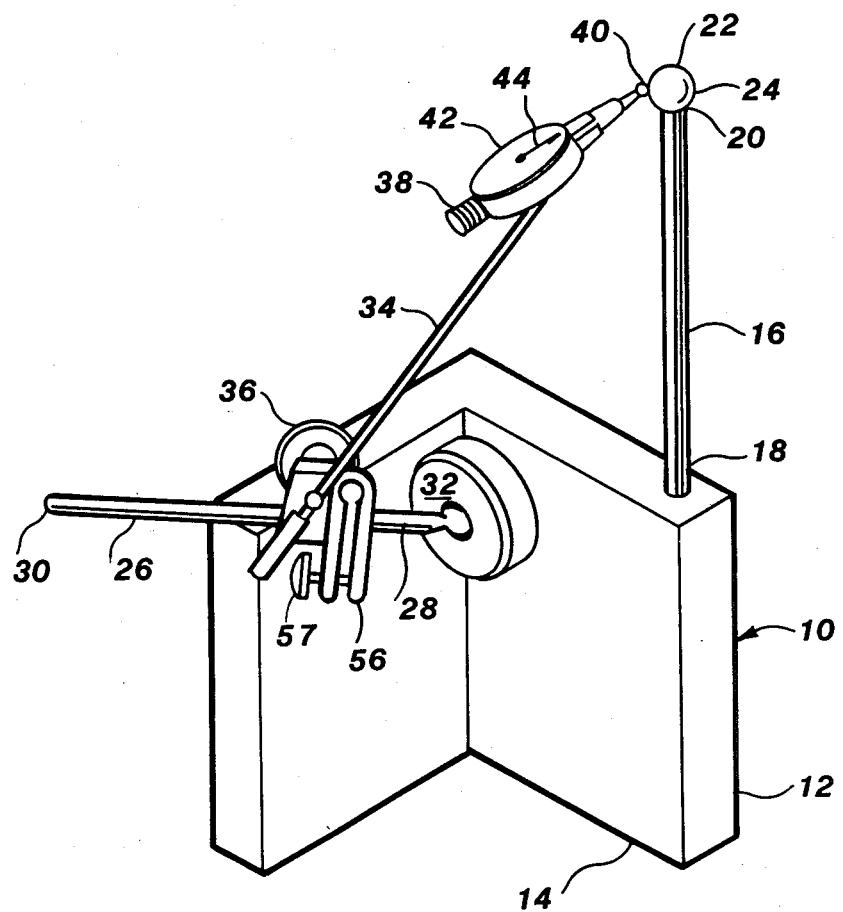
FIG. 1 shows a perspective view of a preferred embodiment of the invention.

Reference is now made to FIG. 1, which shows a perspective view of a preferred embodiment of the invention. The present invention is an apparatus 10 for measuring the thickness of a tube's wall for the tube's entire length and circumference by determining the deviation of the tube wall thickness from the known thickness of a selected standard item. The apparatus 10 comprises a base 12 for supporting the other elements of the apparatus 10. The base 12 can have shapes other than that shown in FIG. 1. Preferably base 12 has a flat bottom 14 so that it will be stable when placed on a flat surface such as a table top. The apparatus 10 includes a first support member 16 having a first end 18 and a second end 20. First end 18 is connected to base 12. Any means of providing a stable connection can be used. A spherical element 22 is connected, preferably with epoxy, to second end 20 of first support member 16. Spherical element 22 has a sufficiently small circumference at its equator 24 that the tube (not shown in FIG. 1) to be measured can be slid over spherical element 22. First support member 16 also has a sufficiently small circumference that the tube to be measured can be slid thereover.

A second support member 26 has a first end 28 and a second end 30. First end 28 is connected to base 12 with a first connector 32 which permits movement of second support member 26. Any means of providing a stable connection can be used. A positioning element 34 is releasably connected to second support member 26 with second connector 36. Positioning element 34 is movable relative to second support member 26. Second connector 36 securely holds positioning element 34 in any desired orientation relative to second support member 26. Preferably, first support member 16, second support member 26 and positioning element 34 are elongated metal rods.

An indicator 38 for indicating the deviation of the tube wall thickness from the known thickness of the standard item is connected to positioning element 34 and moveable thereby to a location proximate spherical element 22. Indicator 38 includes a contact ball 40 and a dial 42 having a rotatable needle 44. Needle 44 is operatively connected to and responsive to the position of contact ball 40.

Figure 2:
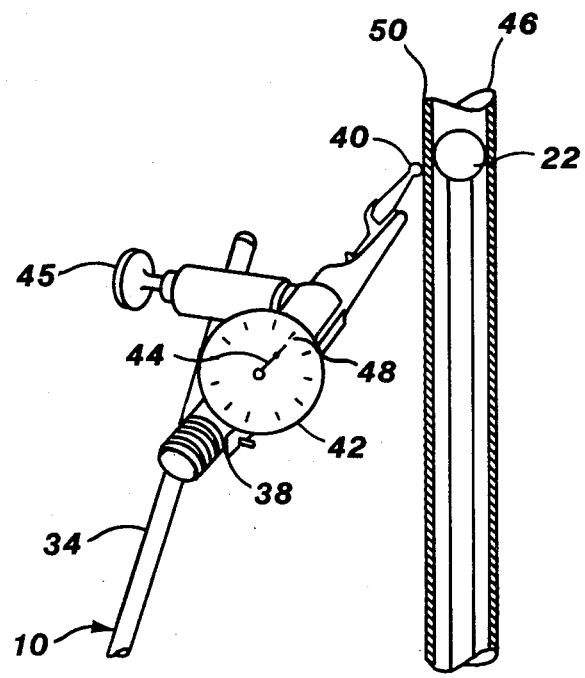
FIG. 2 shows a partial cross-sectional view of a tube being measured with an enlarged view of portions of the embodiment of the invention shown in FIG. 1.

Reference is now made to FIG. 2 which shows a partial cross-sectional view of a tube 46 being measured with portions of the apparatus 10 shown in FIG. 1. Indicator 38 is shown enlarged and in greater detail. A third connector 45 releasably connects indicator 38 to positioning element 34. Contact ball 40 is shown contacting tube 46 which is shown disposed about spherical element 22.

Figure 3:
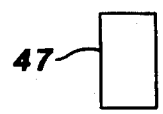
FIG. 3 shows a perspective view of a standard item that can be used with the present invention.

Before tube 46 is placed over spherical element 22, a standard item 47, shown in FIG. 3, is placed between contact ball 40 and spherical element 22. Standard item 47 can be a rectangle of uniform and known thickness, or it can have any shape so long as it includes an identifiable portion having a known uniform thickness. Contact ball 40 is then moved into contact with standard item 47.

Referring again to FIG. 2, dial 42 is preferably rotatable to a zero position 48 to correspond to the thickness of standard item 47. Standard item 47 is preferably chosen with a known thickness that corresponds to the desired thickness of tube wall 50. Tube 46 is then slid over spherical element 22 and rotatable needle 44 indicates the deviation of the thickness of tube wall 50 from the thickness of standard item 47. Tube 46 can be rotated to make measurements about its entire circumference and moved up and down to make measurements about its entire length. Tube 46 can be removed, inverted, and slid over first support member 16 so that a first support member 16 of length L can measure a tube 46 of length 2L.

The dial 42 shown is a Starret Last Word brand dial test indicator, model number 711FS, with 0.001 inch graduation. Other brands and models could also be used. In this preferred dial 42, if the needle 44 deflects to the right (clockwise) the tube wall 50 is thicker than the standard item 47. A deflection to the left indicates that tube wall 50 is thinner than standard item 47.

Figure 4:
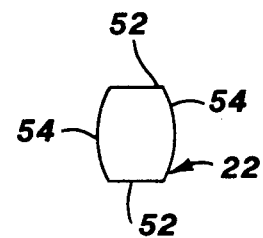
FIG. 4 shows a cross-sectional view of a spherical element that can be used with the present invention.

Reference is now made to FIG. 4 which shows a cross-sectional view of an alternative form of a spherical element 22 that can be used with the present invention. In FIGS. 1 and 2, spherical element 22 is a sphere. In FIG. 4 spherical element 22 has substantially flat polar portions 52 and curved side portions 54.

Referring again to FIG. 1, contact ball 40 is preferably positioned close to the equator 24 of spherical element 22 to improve the accuracy of the apparatus 10. In this preferred embodiment of the invention, tube wall 50 thickness measurements can be made that are accurate to within about 0.0007 cm. This accuracy can be improved if first support member 16 can be made shorter or thicker.

Preferably second support member 26 includes a fine adjustment element 56 for precisely moving indicator 38, and hence contact ball 40. Fine adjustment element 56 has the shape of an elongated clip with a central opening and includes a screw 57 for making slight changes in the location of contact ball 40. By turning screw 57 to the right (clockwise), contact ball 40 can be moved towards spherical element 22. Contact ball 40 is moved away from spherical element 22 by turning screw 57 to the left. Fine adjustment element 56 could instead be included as a portion of positioning element 34.

Figure 5:
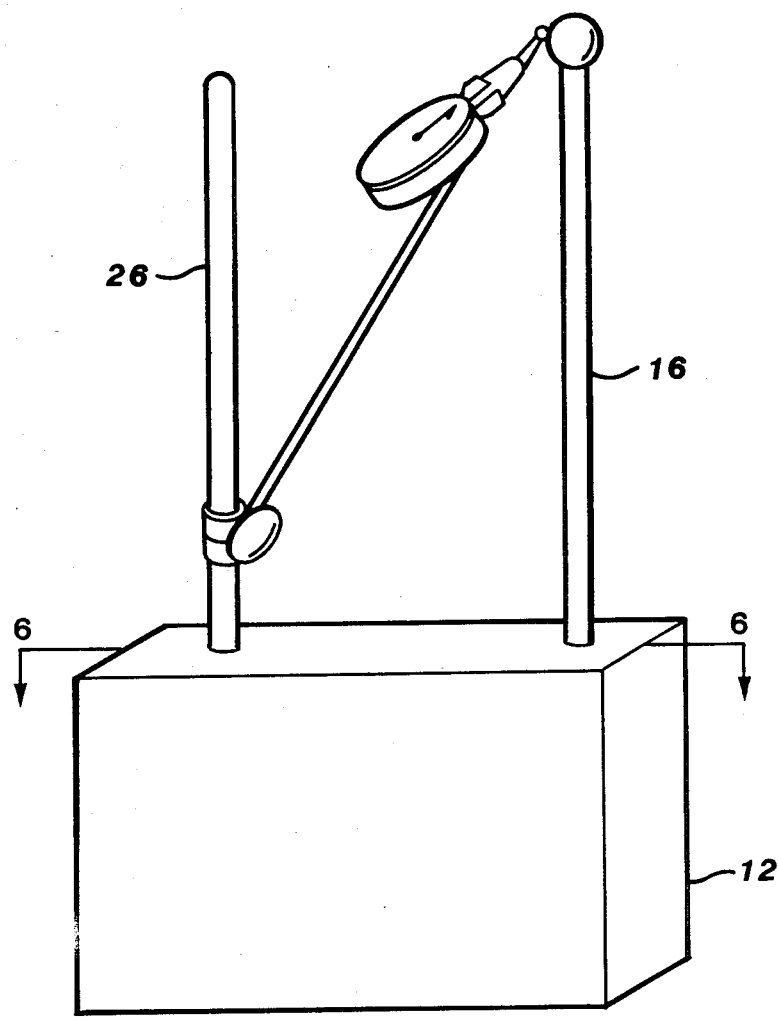
FIG. 5 shows a perspective view of another embodiment of the invention.

Reference is now made to FIG. 5 which shows a perspective view of another embodiment of the invention. A difference between the FIG. 5 embodiment and the embodiment shown in FIG. 1 is that in FIG. 5, first support member 16 and second support member 26 are substantially parallel to each other. Furthermore, base 12 has a slightly different configuration, but this difference is not essential.

Figure 6:
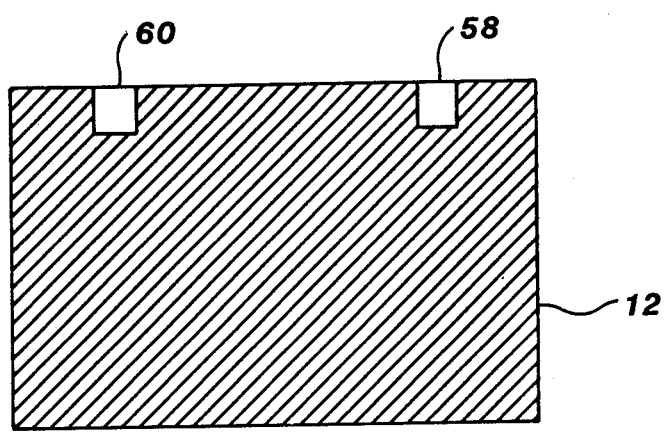
FIG. 6 shows a perspective view in cross section of the base of the embodiment of the invention shown in FIG. 5, taken along section line 6—6 of FIG. 5.

Reference is now made to FIG. 6 which shows a perspective view in cross section of the base 12 of the embodiment shown in FIG. 5, taken along section line 6—6. In this embodiment, base 12 includes portions defining a first bore 58 for receiving first support member 16 and it includes portions defining a second bore 60 for receiving second support member 26. First support member 16 can be of different heights or be adjustable in height to accommodate tubes 46 of different lengths.

The foregoing description of several embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for measuring the thickness of a tube's wall for the tube's entire length and circumference by determining the deviation of the tube wall thickness from the known thickness of a selected standard item, said apparatus comprising:
   a. a base;
   b. a first support member having first and second ends, said first end being connected to said base, said first support member having a sufficiently small circumference that the tube can be slid over said first support member;
   c. a spherical element, said spherical element being connected to said second end of said first support member, said spherical element having a sufficiently small circumference at its equator that the tube can be slid over said spherical element, said spherical element having at its equator a larger circumference than said first support member;
   d. a second support member having first and second ends, said first end being connected to said base, said second support member being spaced apart from said first support member;
   e. a positioning element connected to and movable relative to said second support member; and
   f. an indicator connected to said positioning element and being movable thereby to a location proximate said spherical element, said indicator including a contact ball for contacting the selected standard item and holding it against said spherical element, said contact ball contacting the tube when the tube is disposed about said spherical element, said indicator including a dial having a rotatable needle for indicating the deviation of the tube wall thickness from the thickness of the selected standard item, said rotatable needle being operatively connected to and responsive to the position of said contact ball.

2. The apparatus of claim 1, wherein said dial is adjustable to a zero position to correspond to the thickness of the selected standard item.

3. The apparatus of claim 1, wherein said base includes portions defining a first bore for receiving said first support member.

4. The apparatus of claim 3, wherein said base includes portions defining a second bore for receiving said second support member.

5. The apparatus of claim 1, wherein said first support member and said second support member are substantially parallel to each other.

6. The apparatus of claim 1, wherein said first support member comprises an elongated metal rod.

7. The apparatus of claim 1, wherein said second support member comprises an elongated metal rod.

8. The apparatus of claim 1, wherein said spherical element and said first support member are connected with epoxy.

9. The apparatus of claim 1, wherein said spherical member comprises a sphere.

10. The apparatus of claim 1, wherein said spherical member includes substantially flat polar portions.

11. The apparatus of claim 1, wherein said positioning element comprises an elongated metal rod.

12. The apparatus of claim 1, wherein said second support member includes a fine adjustment element for precisely moving said contact ball.

13. The apparatus of claim 1, wherein said positioning element includes a fine adjustment element for precisely moving said contact ball.

* * * * *